United States Patent [19]

Fryer et al.

[11] 4,077,527

[45] Mar. 7, 1978

[54] APPARATUS FOR DISPENSING AND TRANSPORTING FINE MATERIALS

[75] Inventors: Donald M. Fryer, Fairview; Richard K. Reber, North East, both of Pa.

[73] Assignee: Autoclave Engineers, Inc., Erie, Pa.

[21] Appl. No.: 762,200

[22] Filed: Jan. 24, 1977

[51] Int. Cl.² ............................................. B65G 33/20
[52] U.S. Cl. .................................. 214/17 B; 198/658; 198/659
[58] Field of Search ............... 214/17 B; 198/658, 659; 222/413

[56] References Cited

U.S. PATENT DOCUMENTS 3,104,020  9/1963  Klapp .............................. 198/658 X

*Primary Examiner*—Robert G. Sheridan
*Attorney, Agent, or Firm*—Webb, Burden, Robinson & Webb

[57] ABSTRACT

An apparatus for transporting and dispensing fine materials comprising a rotating conduit with a nonrotating coil spring therein.

5 Claims, 3 Drawing Figures

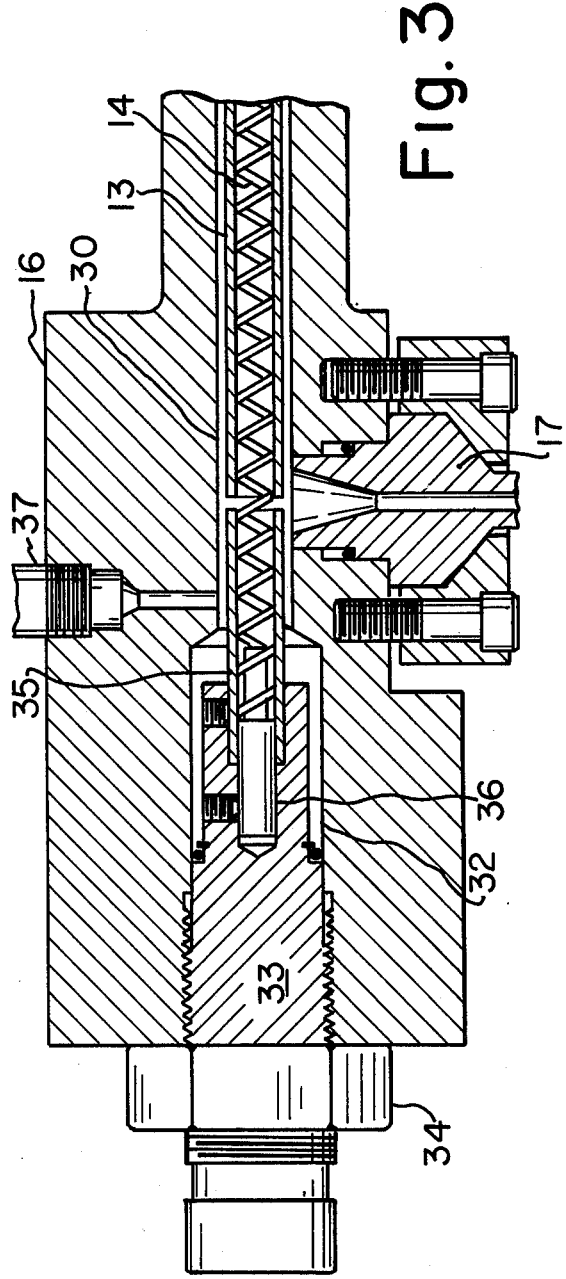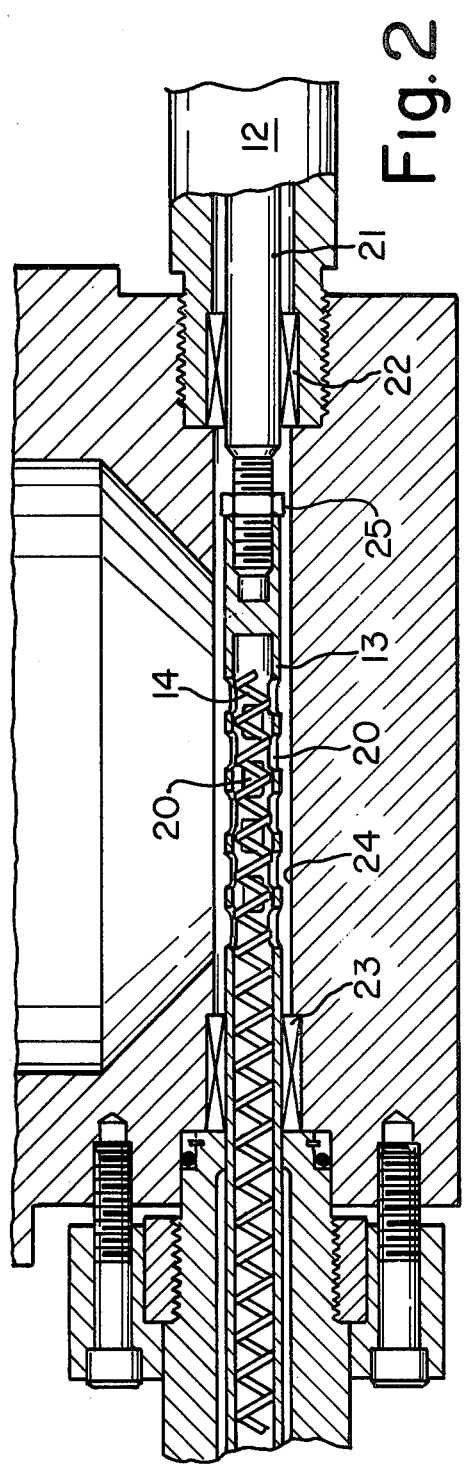

APPARATUS FOR DISPENSING AND TRANSPORTING FINE MATERIALS

This patent application relates to a novel conveyor useful in transporting and dispensing finely divided materials which have a tendency to cake or pack. The novel conveyor is especially useful for fine powders such as powdered coal.

A particularly useful application of the novel conveyor is for feeding powdered coal into a high pressure gas stream. In this application, the conveyor and the feed bin therefor are both within high pressure enclosures. Such high pressure conveyors are used in coal-gas reaction processes.

The prior screw conveyor art discloses a number of spiral or screw conveyors. The most common screw conveyor comprises a helical auger having a standard screw conveyor helix secured to a spindle. The auger is enclosed in a conduit, typically a cylindrical conduit having an inner diameter substantially the same as the outer helix diameter (of course, a clearance is provided). The auger is driven in rotation by driving the spindle at one of both ends. As the auger turns it picks up material at one end and delivers the material at the other. For an auger based upon a righthand helix, that is, a helix in which the translation and rotation directions of the helix generating curve are determined by the orientation of the fingers and thumb of the right-hand respectively, the direction of flow for a given rotation is determined by a left-hand rule. In other words, for a right-hand helix, if the fingers on the left-hand point in the direction of turning, the thumb will point in the direction of material flow. As material is advanced through the screw conveyor it will compact if it flows into the conveyor faster than it flows out of the conveyor. Screw conveyors tend to pack powdered material moving through the conveyor. In that instance, conveyed material may be discharged as lumps and not as a free flowing powder.

In certain prior art patents relating to screw conveyors it has been suggested that the conduit enclosing the auger turn with the auger (see U.S. Pat. Nos. 3,349,894; 3,279,592 and 3,031,064). In one prior art patent, it was suggested the conduit enclosing the auger be arranged to turn with or against the auger (see U.S. Pat. No. 3,104,020). Turning the conduit with or against the rotating auger does not guarantee uniform dispensing without tendency to packing.

A variation of the spiral conveyor is the ribbon screw conveyor: The ribbon screw conveyor may comprise a helically wound ribbon spaced radially outward of a spindle to which it is fixed at space locations. The spindle, when driven, drives the helical ribbon. On the other hand, the ribbon screw conveyor may have no spindle in which case it is driven from the outer edge of the helix as shown, for example, in U.S. Pat. Nos. 2,665,796 and 3,351,181. In these devices, the ribbon actually engages the inner face of the conduit and is driven therefrom.

Briefly, according to this invention, there is provided an apparatus for transporting and dispensing fine materials comprising a cylindrical conduit arranged to be rotated about its axis. The conduit has an inlet near one end of the conduit and an outlet near the other end of the conduit. A helical coil is arranged within the conduit being coaxial therewith. The helical coil is fixed. Means drive the conduit about its axis to impart rotation to the feed in the conduit thus moving the feed against the continuous inclined plane defined by the fixed helical coil and thus through the conduit.

The novel conveyor and dispenser described herein is unlike any of the above described prior art helix conveyors. The ribbon helix is not driven from a spindle nor from the inner face of the conduit. Rather, it is held stationary perferably at the discharge end. The conduit is rotated at sufficient speed without engaging the ribbon-helix to give the powders being conveyed a rotation moving them against the continuous inclined plane defined by the stationary helix. If the ribbon helix, preferably a simple helical coil spring having a diameter somewhat less than the surrounding conduit, is a right-hand helix the direction of flow through the rotating conduit is determined by a right-hand rule. In other words, if the fingers of the right-hand point in the direction of rotation of the conduit, the thumb will point in the direction of material flow.

In prior art conveyors having a rotating auger, rotation of the auger will tend to move material through the conduit because edges of the helix appear to move along the sides of the conduit. Spaced edges of the helix give the appearance of individual moving compartments moving along the conduit and eventually delivering their spaced loads to the discharge opening. Hence, the discharge from the prior art rotating auger conveyors tends to be discontinuous or in spurts. In conveyors according to this invention, however, the auger helix remains stationary and the apparent compartments defined by the helix also remain stationary. There is no change in the position of the helix and apparent compartments with respect to the discharge opening and hence the discharge is at a steady and constant rate.

Further features and other objects and advantages of this invention will become clear from the following detailed description made with reference to the drawings in which:

FIG. 2 is a detailed drawing directed to the drive end of the rotary conduit;

FIG. 3 is a detailed view of the dispensing end of the rotating conduit.

Figure 1:
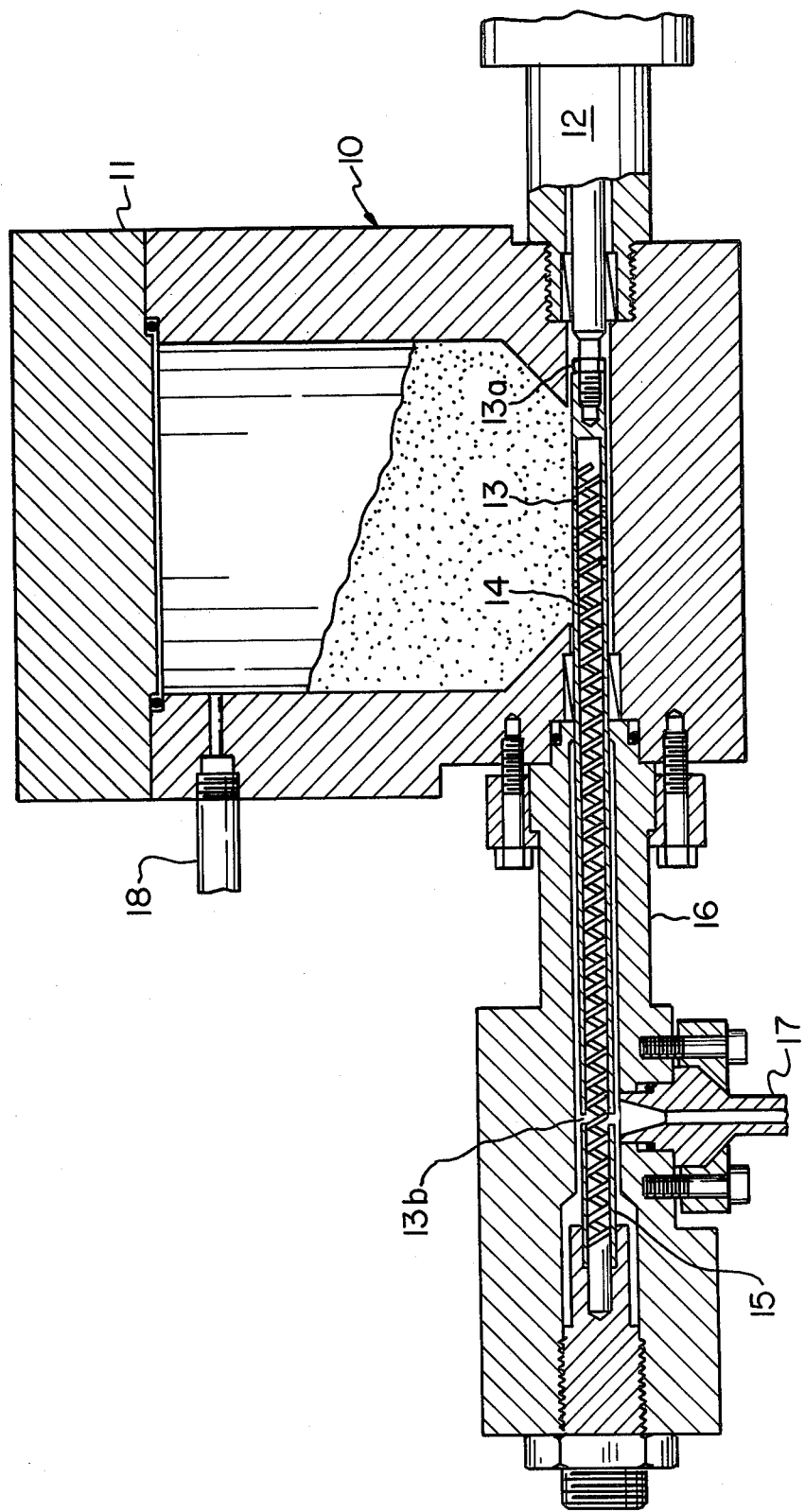
FIG. 1 is a section through a device according to this invention suitable for transporting and dispensing powder under high pressures.

Referring to FIG. 1, there is shown a section view through an embodiment of this invention useful for feeding powdered coal into a high pressure gas stream.

A hopper or feed bin is comprised of a hopper body 10 with cover 11. At the bottom of the hopper and passing completely through the hopper body is a cylindrical passage or bore. Rotatably secured in that passage is a rotating feed tube 13. The feed tube has peripheral openings where it is alined with the hopper, a closed driven end 13a and an open delivery end 13b. Secured to the hopper body is a motor drive 12 for driving the rotary feed tube. The feed tube extends out through the hopper body and into a screw feed housing 16 also secured to the hopper body. The feed tube 13 terminates within the feed tube housing 16 over an outlet conduit 17. A fixed tube 15 is secured to the screw feed housing axially alined with the rotary feed tube. The fixed tube 15 may be adjusted toward and away from the rotary feed tube to adjust the outlet passageway. The principal function, however, of the fixed tube is to anchor the outlet end of the feed spring 14. The hopper and screw feed housing are of heavy construction and are provided with appropriate seals enabling pressurization through receptacle 18. Preferably, the motor drive 12 is a magnetic drive of the type disclosed in U.S. Pat. No. 2,996,363, which enables the drive to be pressurized.

Referring now to FIG. 2, there is shown the details of a drive for the rotating feed tube. The feed tube 13 is provided with openings 20 where it alines with the hopper. In the embodiment shown, the feed tube threadably engages the drive shaft 21 of the drive 12. A lock nut 25, secures and maintains the coupling. Bearing 22, for example, of the plastic type (Rulon bearings) position the drive shaft 21. The feed tube is guided by bearing 23 also of the plastic type. As can be seen, the cylindrical bore at the base of the feed bin is greater in diameter than the feed tube 13. The space between the tube and the bore walls is great compared to the size of the materials being transported and dispensed. Hence, there is no likelihood of binding. The feed spring terminates somewhat past the openings 20 in the feed tube 13. The exact point is not critical except that room for axial expansion must be provided as explained hereafter.

Referring now to FIG. 3, there is shown the details of the feed tube housing 16. The feed tube housing is provided with a small diameter bore 30 to receive the rotating feed tube 13. The rotating feed tube terminates over a discharge funnel 17 secured to the feed tube housing 16. A larger diameter bore 32 is provided in the housing 16 beyond the feed end of the rotating tube 13. Secured in that bore, an axially adjustable threaded plug 33 locked in position by a nut 34 is designed to hold a fixed tube 35 and a spring retainer 36. The fixed tube 35 is axially alined with the rotary tube 13 and the space between tubes is adjustable by adjusting the axial position of the plug 33. The bores 30 and 32 of the housing 16 may be pressurized via the receptacle and opening 37. The plug and spring can be easily removed as can the drive and feed tube from the hopper. This makes cleaning on shutdown relatively simple.

The above described conveyor operates substantially as follows: The feed in the hopper falls into the feed tube 13 through the openings 20 in the wall. The tube imparts rotation to the feed moving it against the continuous inclined plane defined by the helical spring 14. The material is thus urged toward the discharge end of the rotary tube.

The spring is fastened at the discharge end. This is important as the resultant forces tend to move the spring toward the driven end. With the spring secured at the discharge end, the resultant forces tend to elongate the spring with a corresponding decrease in diameter of the spring. This increases the spacing between the spring and the inside wall of the rotating tube. If the spring were secured at the feed end and the resultant forces would tend to compress the spring and urge it into a binding relation with a rotating tube. Now, the resultant forces on the spring fixed at the feed end tend to twist the spring in a direction to unwind it. This unwinding would tend to expand the diameter of the spring and thus force it into a binding relationship with the rotating tube. Hence, the spring must be sufficiently sturdy to withstand the torques to be encountered.

While it is not contemplated that this invention is limited to specific dimensions of rotating tubes and nonrotating springs, it has been found that powdered feed being particles of less than about 50 microns can be moved without packing in a system having the following parameters:

| | |
|---|---|
| Feed Tube | .25" ID |
| Spring | |
| turns/inch | 9 |
| diameter | .24" OD |
| wire diameter | No. 16 AWG (.0508") |
| material | Nickel chrome alloy |
| Speed of feed tube rotation | 32-160 rpm |

By uniformly varying the speed of rotation of the feed tube, the rate of feed can be uniformly varied for a spring with a given pitch. Of course, substitution of springs with different pitches may be desirable to control the rate of feed for a given feed tube rotation speed. This adjustment however requires shutdown and depressurizing.

Having thus defined the invention with the detail and particularly required by the Patent Laws, what is desired to be protected by Letters Patents is set forth in the following claims.

We claim:

1. An apparatus for transporting and dispensing fine materials comprising:
    a cylindrical conduit arranged to be rotated about its axis,
    an inlet at or near one end of the conduit,
    an outlet at or near the other end of the conduit,
    a helical coil arranged within the conduit coaxial therewith, said helical coil fixed against rotation, and
    means for driving the feed tube about its axis to impart rotation to the fine material in the tube thus moving the fine materials through the tube.

2. The apparatus according to claim 1 wherein the helical coil is secured at or near the discharge end of the cylindrical conduit.

3. Apparatus according to claim 2 wherein the axial feed end of the cylindrical conduit is closed, and openings are provided in the cylindrical wall of the conduit to permit the inlet of fine material.

4. An apparatus for transporting and dispensing fine materials under high pressures comprising:
    a completely enclosed high pressure hopper having pressure resistant walls, a hopper block defining the bottom of said hopper, cylindrical walls defining a bore through the hopper block intersecting the base of the hopper, a cylindrical conduit journaled within said bore, means for driving said cylindrical conduit and sealing the bore at one end, a pressure resistant feed tube housing defining a small bore enclosing at least a portion of the rotating conduit extending from the hopper block and being sealed to the hopper block, said feed tube housing having a funnel opening below the termination of the rotating conduit, said feed tube housing having a large bore coaxial with the feed tube, a plug for closing off the larger bore of the feed tube housing, a helical spring or coil arranged within the feed tube and fixed to said plug whereby when the driving means drives the tube material drops from the hopper into the feed tube and is advanced through the tube and discharge into the funnel within the feed tube housing.

5. An apparatus for transporting and dispensing fine materials comprising:
    a cylindrical conduit arranged to be rotated about its axis, an inlet comprising at least one opening in the cylindrical walls of the conduit near one end of the conduit, means comprising a hopper into which the conduit extends for gravity feeding materials through the inlet to the interior of the conduit, an outlet at or near the other end of the conduit, a helical coil arranged within the conduit coaxial therewith, said helical coil fixed against rotation, and means for driving the feed tube about its axis to impart rotation to the fine material in the tube thus moving the fine materials through the tube.

* * * * *